United States Patent
Raitola et al.

(10) Patent No.: US 6,289,003 B1
(45) Date of Patent: Sep. 11, 2001

(54) METHOD FOR TRANSMITTING PACKET SWITCHED DATA IN A MOBILE COMMUNICATIONS SYSTEM

(75) Inventors: Mika Raitola, Masala; Hannu Häkkinen, Espoo; Oscar Salonaho; Mikko J. Rinne, both of Helsinki; Kalle Ahmavaara, Vantaa, all of (FI)

(73) Assignee: EspooMoblie Phones, Limited, Espoo (FI)

( * ) Notice: Subject to any disclaimer, the term of this patent is extended or adjusted under 35 U.S.C. 154(b) by 0 days.

(21) Appl. No.: 09/067,099

(22) Filed: Apr. 27, 1998

(30) Foreign Application Priority Data

Apr. 28, 1997 (FI) .......................................... 971811

(51) Int. Cl.⁷ .............................. H04L 1/16; H04L 1/18; H04B 7/005; G08C 25/02

(52) U.S. Cl. ...................... 370/278; 370/277; 370/282; 370/912; 370/913; 714/748; 714/751

(58) Field of Search ................................... 370/349, 216, 370/277, 278, 282, 912, 913; 714/748, 751

(56) References Cited

U.S. PATENT DOCUMENTS

| | | | |
|---|---|---|---|
| 5,168,502 | 12/1992 | Millet | 371/32 |
| 5,257,257 | 10/1993 | Chen et al. | 370/18 |
| 5,487,068 | 1/1996 | Smolinske et al. | 370/94.1 |
| 5,563,895 | 10/1996 | Malkamaki et al. | 371/32 |
| 5,640,395 | 6/1997 | Hamalainen et al. | 370/322 |
| 5,677,918 | 10/1997 | Tran et al. | 371/32 |
| 5,717,689 | * 2/1998 | Ayanoglu | 370/349 |
| 5,729,534 | 3/1998 | Jokinen et al. | 370/280 |
| 5,729,541 | 3/1998 | Hamalainen et al. | 370/337 |
| 5,802,051 | * 9/1998 | Petersen et al. | 370/395 |
| 5,968,197 | * 10/1999 | Doiron | 714/748 |
| 6,141,784 | * 10/2000 | Davis et al. | 714/748 |

FOREIGN PATENT DOCUMENTS

| | | |
|---|---|---|
| 0 387 957 A1 | 9/1990 | (EP) . |
| 0 595 637 A1 | 5/1994 | (EP) . |
| WO 93/06671 | 4/1993 | (WO) . |

OTHER PUBLICATIONS

Dimitri Bertsekas and Robert Gallager, Data Networks, 1987, Book, pp. 58–73.*

Matsuki et al., "An Error Control Scheme for High–quality, High–speed PHS Data Communications", NTT Review, vol. 9, No. 3, May 1997.

PCT International Search Report.

* cited by examiner

*Primary Examiner*—Hassan Kizou
*Assistant Examiner*—Joe Logsdon
(74) *Attorney, Agent, or Firm*—Perman & Green, LLP

(57) ABSTRACT

The invention relates to a method for transmitting packet switched data in a mobile communications system using an ARQ protocol. In the method the receiver orders the desired transmission units. The transmitter sends transmission units according to the order. Ordering and transmission are repeated until the quality measured by the receiver from each packet exceeds the predetermined quality value and the data which is to be transmitted and consists of packets is transmitted from the transmitter to the receiver. The invention also relates to a mobile communications system implementing the method of the invention.

20 Claims, 6 Drawing Sheets

METHOD FOR TRANSMITTING PACKET SWITCHED DATA IN A MOBILE COMMUNICATIONS SYSTEM

FIELD OF THE INVENTION

The invention relates to a method for transmitting packet switched data in a mobile communications system between a transmitter-receiver pair using an ARQ protocol, which mobile communications system comprises a network part and at least one subscriber terminal and a bidirectional radio connection between the network part and the subscriber terminal, and the transmitter-receiver pair is formed by the network part and the subscriber terminal, and the data to be transmitted on the bidirectional radio connection is inserted in transmission units.

BACKGROUND OF THE INVENTION

Circuit switching is a method in which a connection is established between users by providing a predetermined amount of transmission capacity for the connection. Transmission capacity is exclusively in use of the connection in question for the total duration of the connection. Thus prior art mobile communications systems, such as the GSM-based GSM 900/DCS, 1800/PCS and 1900 systems and the U.S. radio system utilizing the CDMA technology are circuit switched systems. Packet switching is a method in which a connection is established between users by transmitting data in packets which in addition to the actual data contain address information and control information. Several connections may use the same transmission connection simultaneously. Use of packet switched radio systems especially for data transmission has been studied during the past years since the packet switching method suits well e.g. for the data transmission which is needed for interactive computer programs and in which the data to be transmitted is generated in bursts. Thus it is not necessary to reserve a data transmission connection for the total duration of transmission, but only for transmitting packets. This allows to save on costs and capacity considerably both when the network is built and used.

Researches on the packet radio networks began at the University of Hawaii in 1968 in connection with the ALOHA project in which remote equipment were connected to a central computer using a radio connection. In the further development of the GSM system, known as GPRS (General Packet Radio Service), special attention has focused on the packet radio networks. Solutions enabling packet transmission are planned in particular for mobile communications systems of the third generation, such as the UMTS (Universal Mobile Telephone System). The GPRS uses either the basic form or more advanced forms of the ARQ protocol which will be described next.

The ARQ protocol (Automatic Repeat Request) refers to a procedure in which retransmission of the information to be transmitted allows to improve the reliability of the data to be transmitted by improving its bit error rate. According to the protocol, the receiver sends a request for retransmitting the transmitted data to the transmitter if the receiver considers the received data unreliable. Unreliability of data can be found out e.g. by checking the checksum of the received packet. Until now the protocol has been used mainly in fixed networks. A major problem associated with radio networks is that the channels used for transmission on radio connections tend to fade. Fading (Rayleigh Fading) means that signal components that have propagated along multiple paths enter a receiver at reverse phases, and thus they partially cancel each other. In this case the power and the quality of the received signal decrease significantly. In addition to the normal background noise, the reception is hindered by interference caused to the radio connection by radio connections that are on the same channel and on the adjacent channels. The influence of interference and fading may be occasionally so harmful that the radio channel fades, i.e. its quality becomes so poor that the information transmitted on the channel cannot be recognized. On the other hand, the occasionally fading channel occasionally also has a very good quality.

A more advanced form of the ARQ basic protocol is the hybrid-ARQ which utilizes the combination of the ARQ and the FEC (Forward Error Correction). FEC means that the information to be transmitted is encoded using error correction coding. According to the improved type II hybrid-ARQ protocol, developed from the hybrid-ARQ, the data to be transmitted is coded so that the data is divided into several data blocks, and the data block to be transmitted first includes the data to be transmitted in uncoded form or in slightly encoded form. If the receiver considers the first data block erroneous, the receiver requests transmission of the next data block. In the subsequent data blocks the data to be transmitted is encoded differently than in the first data block. By combining the information of the data blocks the receiver can decode the coding and find the original data. The data to be transmitted can be encoded e.g. using ½-convolutional coding, and thus the amount of data doubles.

Applications using packet switching require very low bit error rates, for example even a bit error rate of $10^{-9}$ is required of some data transmission services. Examples of such applications are wireless transmission of measurement data intended for medical purposes and wireless transmission of commands intended for controlling some device.

When data is transmitted on a radio connection that fades occasionally, the signal quality can be improved by adding interleaving to convolutional coding. Interleaving scatters transmission errors, and thus they can be corrected by means of convolutional coding. When retransmission is used for correcting errors, interleaving periods should be short so that it would be possible to adjust to channel changes quickly and to avoid transmitting a lot of data that was received without errors because of a few erroneous sections. On the other hand, interleaving benefits from long interleaving benefits since the influence of channel conditions averages out.

It is problematic to combine retransmissions and interleaving effectively when the unit of data the retransmission of which is requested is shorter than the interleaving period. At the moment retransmission should be requested it is impossible to know whether it would be possible to correct the error later on by means of deinterleaving and decoding the convolutional coding. If errors are found in the received packet after deinterleaving and decoding of the convolutional coding, all transmission units that belong to the interleaving period have to be retransmitted, since after decoding it is no longer known which transmission units were erroneous.

For example, in a proposal relating to the above-mentioned GPRS, interleaving was performed over four subsequent GSM frames and the return channel for a retransmission request was located in each fifth GSM frame. Due to the problem described in the previous paragraph, the duration of interleaving has been reduced in the GPRS of the GSM from 19 transmission units used in circuit switched data transmission in the GSM to 4 transmission units, which weakens the error-averaging influence of interleaving. Even in this case all four transmission units have to be also retransmitted, even though only one transmission unit had contained errors.

A major problem associated with the ARQ protocols described above is that the signalling used in them is ineffective. In known signallings whole packets are indicated. Such a solution does not utilize radio resources effectively since the data transmitted without errors also needs to be retransmitted.

BRIEF DESCRIPTION OF THE INVENTION

An object of the present invention is to provide a method for transmitting packet switched data which allows to eliminate the problems described above.

This is achieved with the method for transmitting packet switched data in a mobile communications system between a transmitter-receiver pair using an ARQ protocol, which mobile communications system comprises a network part and at least one subscriber terminal and a bidirectional radio connection between the network part and the subscriber terminal, and the transmitter-receiver pair is formed by the network part and the subscriber terminal, and the data to be transmitted on the bidirectional radio connection is inserted in transmission units. According to the invention, the method is characterized in that the receiver orders the desired transmission units, and the transmitter sends transmission units according to the order, and ordering and transmission are repeated until the quality measured by the receiver from each packet exceeds the predetermined quality level and the data which is to be transmitted and consists of of packets is transmitted from the transmitter to the receiver.

The invention also relates to a mobile communications system for transmitting packet-switched data between a transmitter-receiver pair using an ARQ protocol, which mobile communications system comprises a network part and at least one subscriber terminal and a bidirectional radio connection between the network part and the subscriber terminal, and the transmitter-receiver pair is formed by network part and the subscriber terminal, and the data to be transmitted on the bidirectional radio connection is inserted in transmission units. According to the invention the mobile communications system is characterized in that the network part and/or the subscriber terminal comprise a control part, which is arranged to control packet transmission in such a manner that the receiver orders the desired transmission units, and the transmitter sends transmission units according to the order, and ordering and transmission are repeated until the quality measured by the receiver from each packet exceeds the predetermined quality level and the data which is to be transmitted and consists of packets is transmitted from the transmitter to the receiver.

The method of the invention has several great advantages. Use of the radio resources becomes considerably more effective.

The invention allows to use different methods for making transmission more effective. It is, for example, possible to retransmit and combine transmission units of poor quality before detection. This allows to eliminate harmful fades nearly completely, even so well that the capacity of the transmission channel is close to that of the theoretical channel of the AWGN type (Average White Gaussian Noise).

The method can also be used in systems in which the re-use pattern is one, i.e. the same carrier frequencies and time slots are used in adjacent cells.

The arrangement of the invention has the same advantages as the method of the invention. It is clear that preferred embodiments and detailed embodiments can be combined with each other in order to achieve the desired technical effect.

BRIEF DESCRIPTION OF THE DRAWINGS

In the following the invention will be described in greater detail with reference to the examples illustrated in the accompanying drawings, in which FIG. 3 illustrates an example of data transmission using the method of the invention.

DETAILED DESCRIPTION OF THE INVENTION

The present invention can be used in all mobile communications systems in which data is transmitted using packet switching. The term "transmission unit" refers to a transmission unit which is used on a bidirectional radio connection and is the protocol data unit of the first layer (i.e. physical layer) of the seven-layer OSI model of the ISO (Layer 1 Protocol Data Unit). In the TDMA system, for example, the transmission unit may consist of one or more TDMA time slots. In the CDMA system the transmission unit may be a limited period with one or more spreading codes. In the FDMA system the transmission unit may be a limited period with one or more frequencies. In hybrid systems utilizing several multiple-access methods the transmission unit may be any combination of the above examples. Generally speaking, the transmission unit is any resource that can be indicated on the transmission path, i.e. radio connection.

The method of the invention is used for transmitting packet switched data in a mobile communications system between a transmitter-receiver pair using an ARQ protocol. The mobile communications system comprises a network part and at least one subscriber terminal. In this context the network part refers to a fixed element of the network, e.g. a base station, base station controller, mobile services switching centre, or different combinations of these elements. A subscriber terminal may for example be a mobile station, a car phone, or a phone utilizing WLL (Wireless Local Loop). The transmitter-receiver pair is formed by the network part and the subscriber terminal. The network part can function both as the transmitter and as the receiver, and the subscriber terminal may similarly function in either way. There is a bidirectional radio connection between the network part and the subscriber terminal. Transmission units are used for data transmission on the bidirectional radio connection.

Figure 1A:
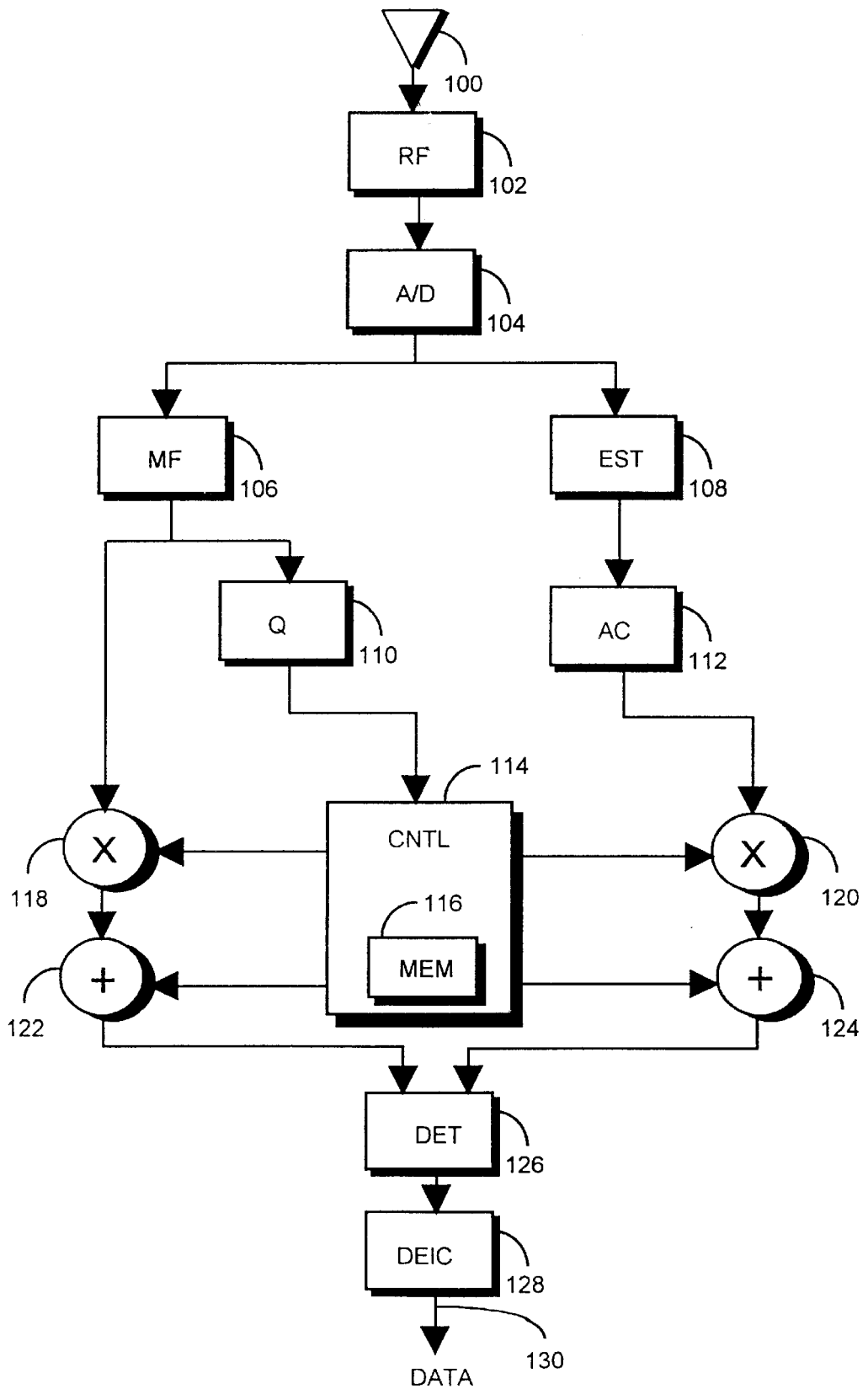
FIGS. 1A and 1B are block diagrams illustrating example of receivers of the invention.
Figure 1B:
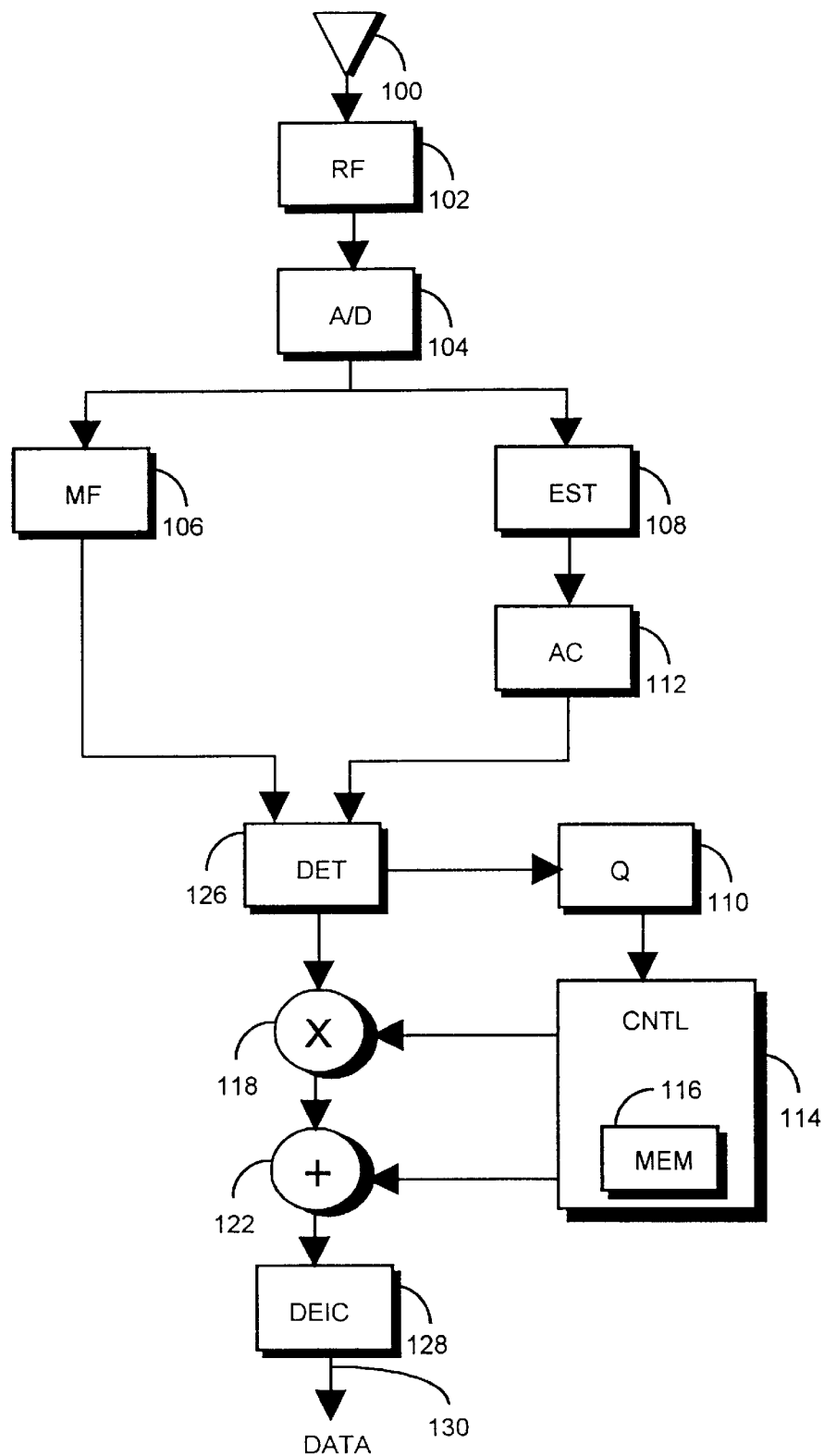

FIGS. 1A and 1B are simplified block diagrams illustrating receivers of the invention. The figures illustrate only the blocks relevant to describing the invention, but it is obvious to one skilled in the art that an ordinary receiver also has several other functions and structures which need not be described more closely in this context. In practice, the receiver may be e.g. a standard receiver of the GSM system which has been modified according to the invention.

A signal received by an antenna 100 is supplied to a channel matched filter 106 and channel estimator 108 via radio frequency parts 102 and A/D conversion 104. The results provided by the channel estimator 108 are supplied to the channel matched filter 106 and autocorrelation calculation 112. The results are also supplied to a quality part 110 in which the quality of received transmission units is assessed. Using weighting means 118, 120 in combination a transmission unit can be weighted on the basis of its quality value. Combination means 122 are used for forming a combined transmission unit, and combination means 124 for providing autocorrelation values for the combined transmission unit. A signal is detected in a signal detection part 126 from which the detected and received symbols are taken into further processing, e.g. when coding and interleaving are used, the symbols are supplied to means 128, in which a packet is decoded and deinterleaved, and the result of this is the originally transmitted data 130. The receiver also comprises a control part 114, which controls the operation of different means. The control part 114 further comprises a memory 116 in which information can be stored during the processing. The weighting means 118, 120 and the combination means 122, 124 are optional since combination of transmission unit is an optional function that improves the performance of the method.

The originally transmitted transmission unit and retransmitted transmission units as well as their autocorrelation values are stored in the memory 116 of the control part 114. When the transmission unit achieves the required quality level, the transmission units and the corresponding autocorrelations are combined in the combination means 122, 124 and they are supplied to the detection part 126, where the received symbols are detected. The required quality level means quality that is high enough for eliminating occasional channel fading. One transmission may be enough for some transmission units, but on the other hand retransmission may have to be repeated even dozens of times if the conditions deteriorate.

FIG. 1A illustrates the receiver described above in which the quality of transmission units is measured before detection. FIG. 1B correspondingly illustrates a receiver in which the quality of transmission units is measured after the signal has been detected. It is not necessary to explain FIG. 1B more closely in this context, since the function of the receiver of FIG. 1B will be obvious to one skilled in the art on the basis of the explanation of FIG. 1A.

The modifications required by the invention are directed to the control part 114. Even though FIGS. 1A and 1B do not illustrate this, there is a connection from the control part 114 to the transmitter, i.e. the control part 114 orders the desired transmission units through the transmitter. Thus the transmitter sends transmission units according to the order. Ordering and transmission are repeated until the quality measured by the receiver from each packet exceeds the predetermined quality level and the data which is to be transmitted and consists of packets is transmitted from the transmitter to the receiver. Quality can be measured either before or after the signal is detected, as is illustrated in FIGS. 1A and 1B. In the following examples illustrating the invention the quality is measured before the signal is detected.

At its simplest the invention is implemented with a software, in which case the control part 114 is a digital signal processing processor or a general processor, and the steps of the method are measures carried out by the software. The invention can also be implemented e.g. with discrete logic composed of HW parts or with the ASIC (Application Specific Integrated Circuit).

Figure 2:
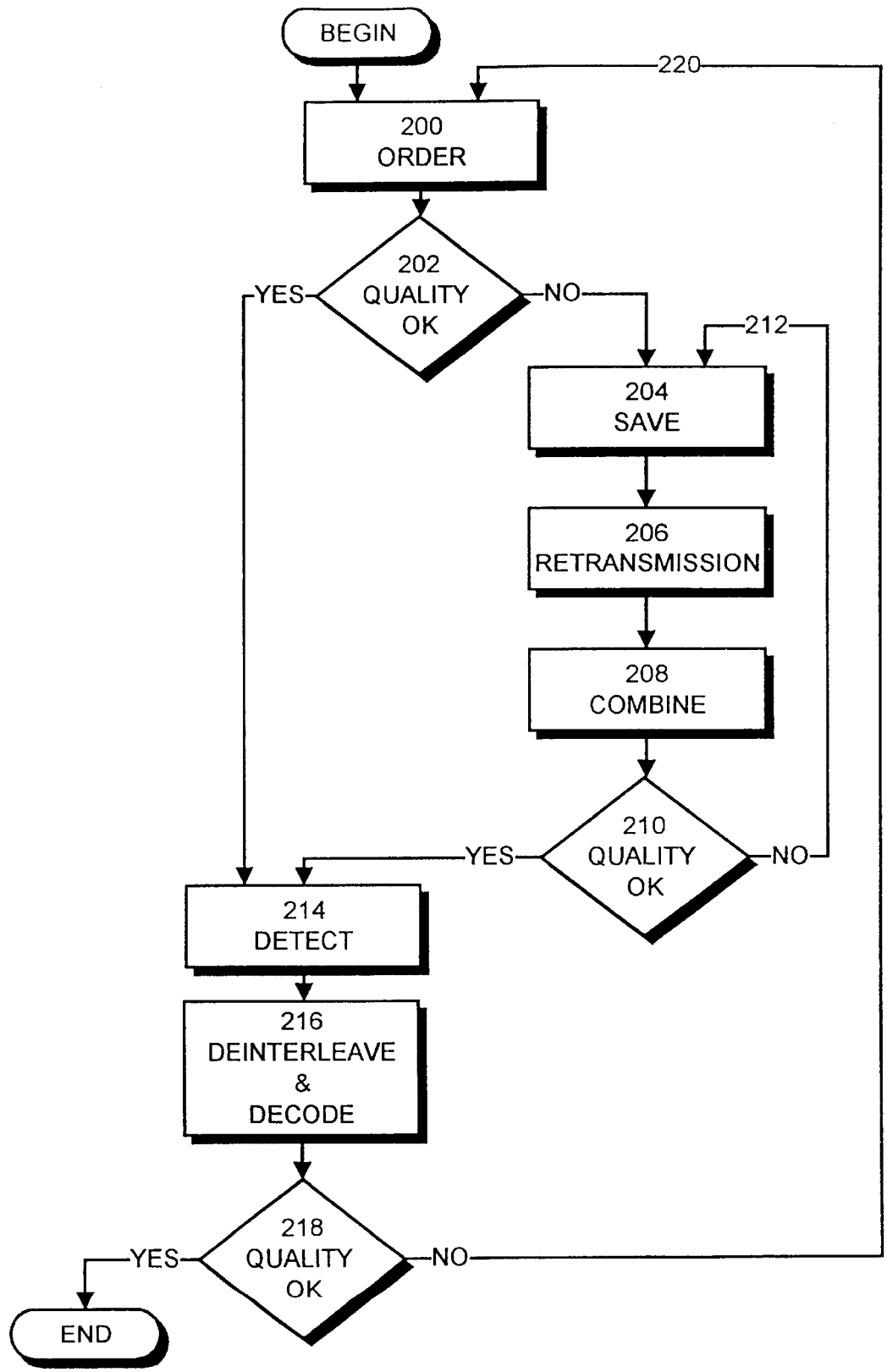
FIG. 2 is a flow chart illustrating an example of execution of the method of the invention.

FIG. 2 is a flow chart illustrating the steps of the method more closely.

Step 200: The receiver orders the desired transmission units. Thus the receiver knows how the data are organized, as will be described later on.

Step 202: Check the quality of each received transmission unit independently. The receiver has thus already received at least one transmission unit. If the quality of the transmission unit corresponds to the predetermined quality level, the process proceeds to step 214 in which the signal is detected.

Step 204: Store the received transmission unit. The received transmission unit was not of a good enough quality, and thus it is stored for further processing.

Step 206: Send a retransmission request formed on the basis of the quality of the transmission units. Now the transmitter is requested to retransmit the same transmission unit the quality of which did not satisfy the required quality level. Receive the retransmitted transmission unit. This can be carried out immediately after the request or later on.

Step 208: Form a combined transmission unit. A combined transmission unit is formed by combining transmission units received later with the originally received transmission unit.

Step 210: Check the quality of the combined transmission unit. In principle, this is the same check as in step 202. The difference between them is that in step 202 the quality of the originally received transmission unit was checked, whereas in this step the quality of the combined transmission unit is checked. This unit contains both the originally received transmission unit and all retransmissions of the original transmission unit received thereafter. If the quality of the combined transmission unit corresponds to the predetermined quality level, the signal can be detected. If the quality of the combined transmission unit does not correspond to the predetermined quality level, the process will return 212 to step 204, in which the last-received transmission unit is stored, whereafter retransmission is repeated.

Step 214: Detect the signal, i.e. process the transmission unit that is either the originally sent transmission unit or a combined transmission unit. After this step has been performed, the processing of the transmission unit in question can be finished. Then the following transmission unit, for example, can be received and its processing started from step 202.

The order mentioned in step 200 and the restransmission request mentioned in step 206 are both orders of the invention, and their structures are preferably similar.

Storing of transmission units of poor quality, combination of transmission units and quality measurement referred to in steps 204, 208 and 210 are not necessary functions. In the simplest embodiment, a received transmission unit of poor quality can be deleted, or retransmission can be requested so many times that the received transmission unit is of sufficient quality at once. The combination described is, however, a preferred embodiment of the invention and improves the performance of the method.

In the method the execution order of the steps is not relevant, but the order of the steps can be changed and new steps can be added. The only thing that is relevant is that in one order message the receiver possibly orders several transmission units that have been picked in the desired manner, even from different packets.

The invention suits especially well for data transmission in which the packets to be transmitted are interleaved and encoded. For the sake of clarity it is assumed in the next example that one packet forms one interleaving period. In practice, a packet may consist of several interleaving periods. First, the data to be transmitted is divided into sections of the size of a predetermined packet. The data of each packet is interleaved and encoded e.g. by means of convolutional coding. A CRC checksum (Cyclic Redundancy Check) may also be formed. Each packet is then divided into transmission units individually. One packet is included in at least one transmission unit. The transmitter informs the receiver of the organization of the data to be sent in the manner agreed in advance. The information comprises e.g. the number of the packets, number of the transmission units, numbering of the packets, numbering of the transmission units, and possibly other information. The transmitter receives information from the receiver on the order in which the transmission units should be transmitted. The receiver may at any point request retransmission of a packet or a transmission unit. The functions of the transmitter are thus chiefly controlled by the receiver.

At the receiving end the procedure is the same as described above, except that when the signal has been detected, the packet is deinterleaved and decoded. On the basis of the quality of the packet it is then possible to decide whether to request retransmissions of the transmission units of the packet. FIG. 2 also illustrates this embodiment:

Step 200: First the receiver receives the organization of the data. On the basis of this the receiver knows how the transmitter has organized the data into packets and transmission units and what kind of identification data are used. Some of the data may be prearranged, e.g. in the system's control data which are known both by the transmitter and the receiver. Then the receiver orders transmission units in the desired order. The order is formed using a predetermined order algorithm. The structure of the order algorithm may vary. According to the simplest algorithm the transmission units are ordered in sequential order. According to another kind of algorithm the first transmission units are ordered first from each packet, then the second ones, etc. This has the advantage that occasional fading on the channel does not affect all transmission units of the same packet, but transmission units of different packets. This is in fact a kind of interleaving occurring between the transmission units. The interleaving scatters errors over a longer period, which improves the capacity of the receiver. The order algorithm also defines the order strategy, i.e. whether to order all transmission units at once, or whether to order only a certain number of transmission units, after the reception of which it is decided whether to order new transmission units or retransmissions of the transmission units already received.

Steps 202, 204, 206, 208 and 210 are performed as was described above.

Before it is possible to proceed to detection 214, transmission units of at least one packet should be already received so that the packet could be decoded. If convolutional coding is used according to the type II hybrid-ARQ protocol, even part of the transmission units may be enough for decoding the packet.

Step 216: Deinterleave and decode the packet. The quality of the transmission units of the packet was so good that it is worthwhile deinterleaving and decoding the packet.

Step 218: Check whether the packet is faulty. Now it is checked whether there were errors in the packet e.g. by checking the CRC checksum. If there were errors in the packet, return 220 to step 200 in which retransmission of the transmission units of the poorest quality, for example, is ordered according to the order algorithm. If there were no errors in the packet, the originally transmitted data can be processed, e.g. they can be supplied to the application that ordered the packet. Then it is possible to check whether all data have been processed. The subscriber knows how many packets or transmission units the transmitter was to transmit. If all the data have been processed, the function can be discontinued. If this is not the case, return to step 200, in which according to the order algorithm more packets or the missing packets are ordered, for example.

Figure 3A:
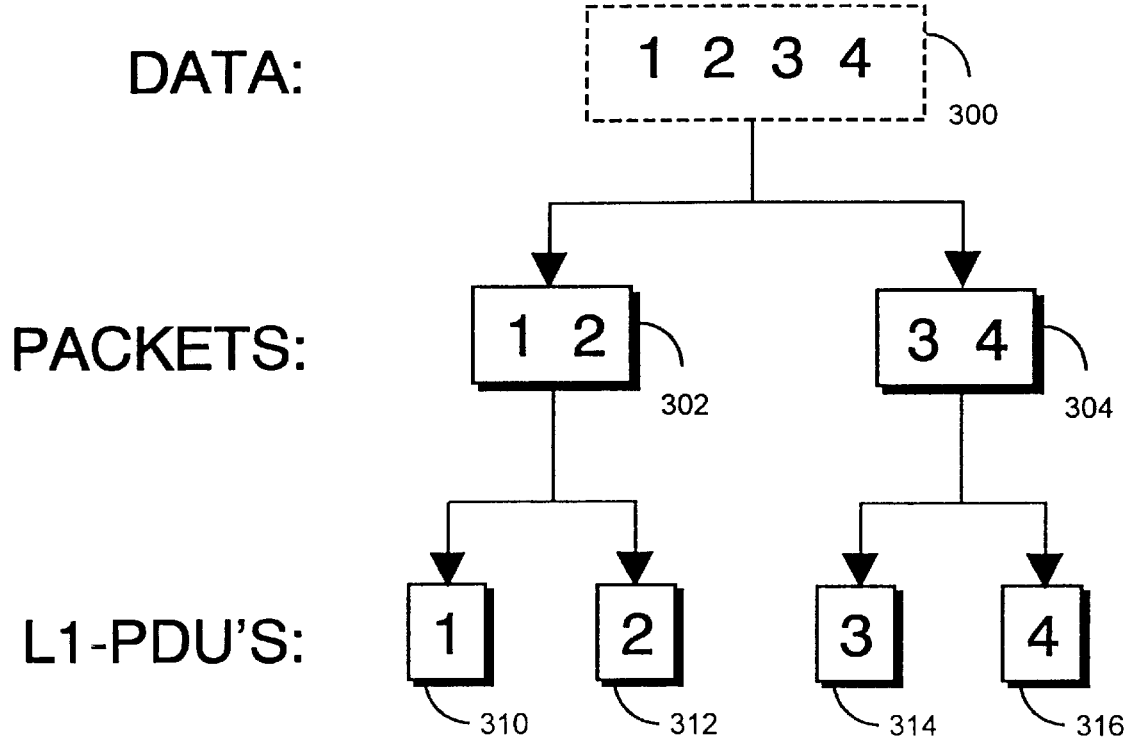
FIG. 3A illustrates data processing during transmission.

FIG. 3 illustrates an example of how packets are transmitted according to the method. In FIG. 3A the transmitter divides the data 300 to be transmitted into packets. The first packet 302 contains data 1 2 and the second packet 304 data 3 4. Both packets are further divided into transmission units. The first packet 302 is divided into two transmission units. The first transmission unit 310 contains data 1 and the second transmission unit 312 data 2. The second packet 304 is divided into two transmission units correspondingly. The first transmission unit 314 contains data 3 and the second transmission unit 316 data 4. For the sake of simplicity the data describing the data to be transmitted in this example are as simple as possible, but in reality the data are, of course, much more complex. Neither the information structures required by the packets and transmission unit have been described for the sake of simplicity, nor the possible use of interleaving and coding.

Figure 3B:
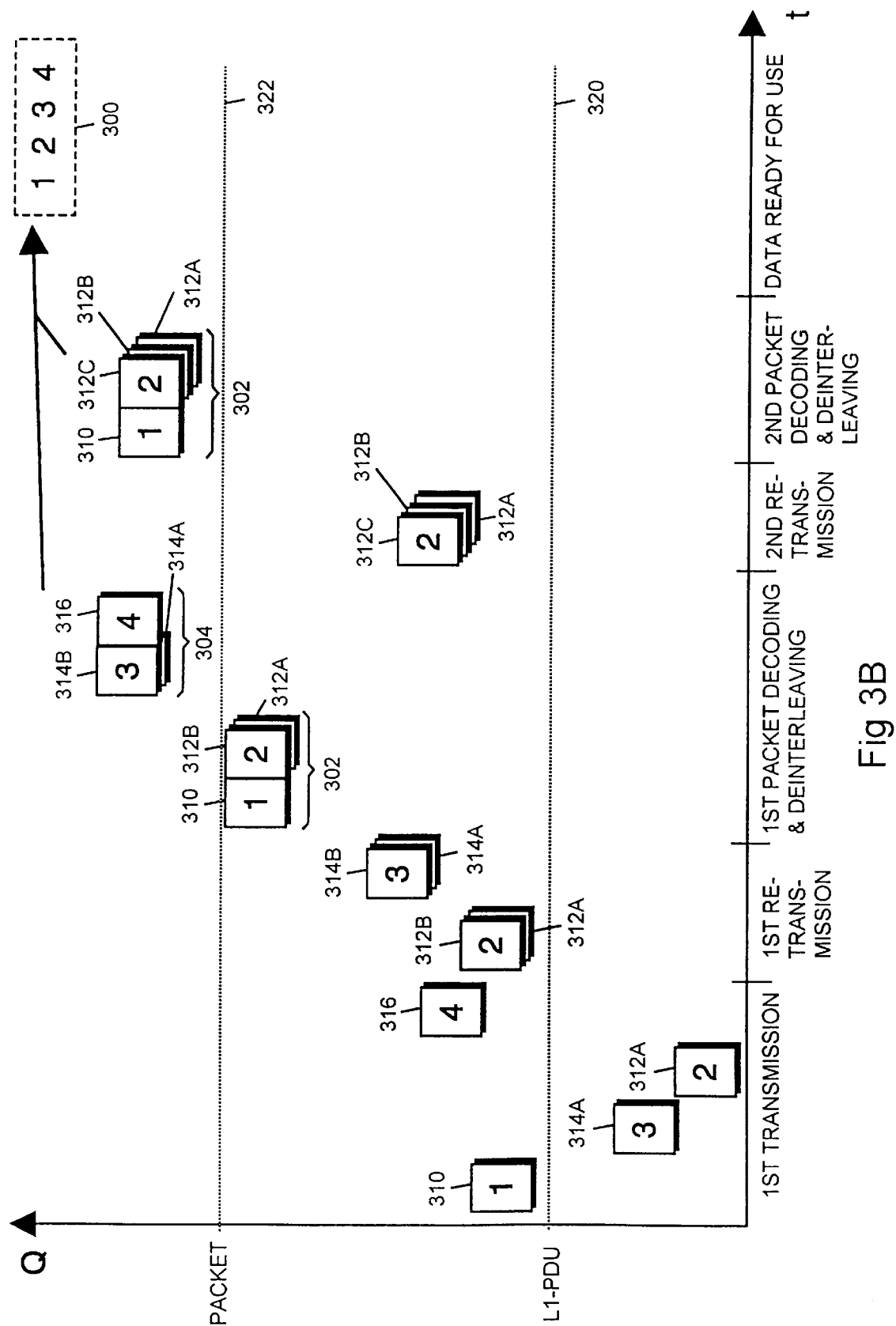
FIG. 3B illustrates data processing at the receiving end.

In FIG. 3B the X-axis indicates time and the Y-axis quality. Quality refers to the measured quality of a transmission unit and the measured quality of a packet. The quality of a transmission unit and the quality of a packet are not proportional to each other; they have been placed on the same Y-axis only to facilitate illustration. The quality of a transmission unit is typically determined by measuring the signal-to-noise ratio of the transmission unit, and the quality of a packet is determined by checking the CRC of the packet.

First the receiver orders and receives all transmission units 310, 321A, 314A, 316 once. Two transmission units 310, 316 satisfy the quality level 320 required of a transmission unit. Two transmission units 312A, 314A do not satisfy the required quality level 320 due to a sudden fading on the radio path, and thus retransmission 312B, 314B will be carried out. Now the quality of the transmission units 312B and 312A, 314B and 314A combined according to the invention exceeds the required quality level 320. Thus the packets can be deinterleaved and decoded. The quality of the packet 304 formed of the transmission units 314B, 314A and 316 exceeds the quality level 322 required of a packet, and thus it is ready for processing. The quality of the packet 302 formed of the transmission units 310, 312B and 312A is lower than the quality level 322 required of a packet, and thus the worse transmission unit 312 of the packet is retransmitted 312C. Now the quality of the combined transmission unit 312C, 3142, 312A clearly exceeds the quality level 320 required of a transmission unit, and thus it is detected when the packet 302 formed of the transmission units 310, 312C, 312B and 312A is deinterleaved and decoded that its quality exceeds the quality level 322 required of a packet. Thus the data 300 transmitted originally by the transmitter can now be decoded at the receiving end.

There are several methods for checking the quality of the transmission unit and the packet. It is possible to form a CRC error checksum separately both for the transmission unit and the packet in the transmission. This sum is used for checking at the receiving end whether the transmission unit and/or the packet contains errors. It is also possible to use other ways of 25 forming the error checksum. Quality can also be determined by forming a bit error rate of the transmission unit. The quality of a received transmission unit can also be determined by forming the C/I ratio (Carrier/interference) of the transmission unit by means of the training sequence. This is carried out e.g. by correlating a known training sequence on the basis of the impulse response of the channel estimated in the channel estimator 108. The difference between this correlation and the training sequence included in the actual received transmission unit determines the noise and interference of the received signal. This can be expressed by the following equation $$y = x * h + I + N$$

where * represents a mathematical convolution operator, y is the received signal, x is the transmitted signal, h is the channel impulse response, I is interference and N is noise. This allows the signal-to-noise ratio, i.e. the C/I ratio, to be calculated; C is the energy of the received training sequence. In the above we have given some examples of how the quality of a transmission unit or a packet can be determined. It is, however, possible to use any other prior art method for measuring the quality. The quality can also be determined after detection, e.g. by comparing a received training sequence with a detected training sequence.

The method of the invention requires a bidirectional transmission path since data is transmitted in one direction and control information, e.g. retransmission requests, in the other. The basic requirement is that the transmitter and the receiver are able to indicate each transmission unit unequivocally by means of an identifier at their own ends (L1-PDU-ID=Layer 1 Protocol Data Unit Identification). The transmitter should be able to decode the identification data used for the transmission unit by the receiver so that when the receiver gives any identification data, the transmitter knows which identification data of the transmission unit it corresponds to.

In the following we shall give an example of how a protocol is processed when information is transmitted using the uplink transmission path, i.e. from the subscriber terminal to the network part. The transmitter, i.e. the subscriber terminal, requests capacity for transmitting a certain amount of data. The amount is expressed by a number which can be directly interpreted as the number of transmission units that are needed. Having received the request the network part allocates an identifier (RID=Reservation Identification) to the subscriber terminal for transmission of the data.

The subscriber terminal simultaneously listens to the channel (CCH=Control Channel) on which the allocations of resources are announced. On the CCH the network part announces which RID is allowed to transmit on which traffic channel (TCH). The subscriber terminal also listens to an order channel (FO=Forward Order), on which the network part announces which transmission units and on which TCH a subscriber terminal having a certain RID should transmit. In other words, the subscriber terminal monitors the occurrence of its own RID on the CCH, and having noticed its own RID it finds out from the FO which transmission units it should transmit on the TCH. It is of course possible to allocate several TCHs, in which case the subscriber terminal sends its transmission units to the network part on all of them.

The subscriber terminal concludes from the L1-PDU-IDs requested on the FO which transmission units will no longer be requested to be retransmitted, i.e. their quality has been good enough when the network part has received them or a good enough quality has been achieved by combining transmission units. Thus the subscriber terminal can control its reception buffer, i.e. remove unnecessary transmission units from its buffer. The network part correspondingly knows which transmission units it no longer needs, and thus it can control its own transmission buffer. Transmission continues as was described above until the total amount of data has been transferred.

The following example correspondingly describes how a protocol is processed when data is transmitted in the downlink direction, i.e. from the network part to the subscriber terminal. The transmitter, i.e. the network part, informs the receiver of the identifier (RID) which it will use for transmitting a certain amount of data. The amount of data can also be communicated.

The subscriber terminal starts to listen to the CCH, on which the network part announces to which RID transmission units are transmitted on each TCH. The network part may also transmit on the FO, on which it announces which transmission units will be transmitted on which TCH. The subscriber terminal also listens to the order allocation channel (FOS=Forward Order Scheduler), on which the network part announces on which FO a subscriber terminal related to a certain RID is allowed to transmit an order. It is not compulsory to use the FOS, in which case the subscriber terminal knows on which FO and when it should transmit an order.

On the FO the subscriber terminal communicates the L1-PDU-IDs the network part should transmit on the TCHs it has allocated. The network part also concludes from the information given on the FO or another channel which transmission units will no longer be ordered, and thus it can remove these units from its transmission buffer. The subscriber terminal knows which transmission units it will no longer order, and thus it can control its reception buffer.

Figure 3C:
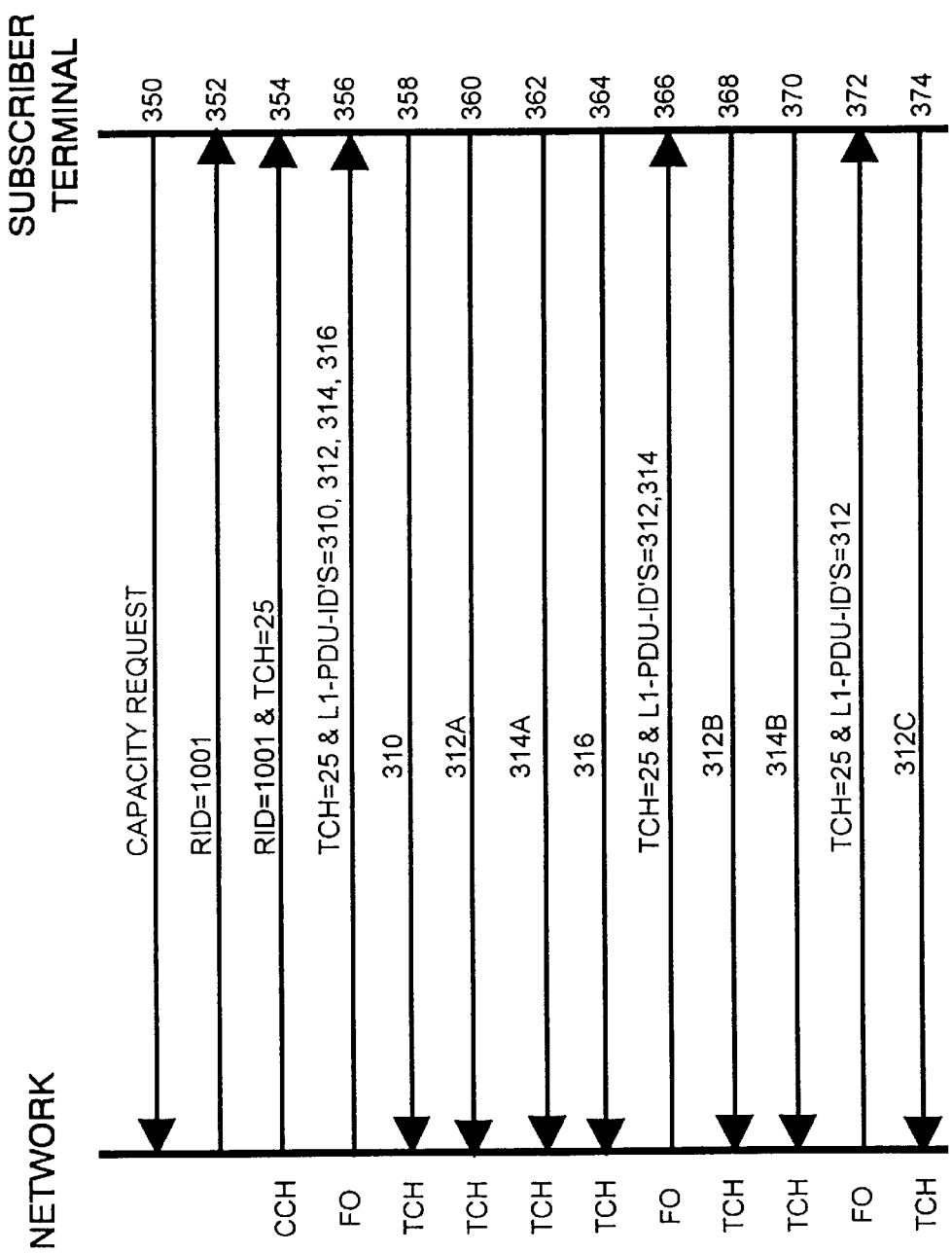
FIG. 3C illustrates signalling related to the transmission.

As regards protocol processing, the data transmission described in FIG. 3B is performed e.g. in the manner described in FIG. 3C. It is assumed that the transmitter is the subscriber terminal and the receiver is the network part. Thus the case of the uplink transmission path also applies to this case. The subscriber terminal requests 350 capacity for transmitting the transmission units 310, 312, 314, 316. Having received the request the network part allocates 352 a RID having a value of 1001 to the subscriber terminal. The network part communicates 354 on the CCH that a RID having a value of 1001 may transmit on a TCH having a value of 25. The subscriber terminal also listens to the FO on which the network part communicates 356 that the subscriber terminal should transmit the transmission units the L1-PDU-IDs of which are 310, 312, 314, 316 on the TCH having a value of 25. Next the subscriber terminal sends 358, 360, 362, 364 the requested transmission units 310, 312, 314 and 316 on the TCH having a value of 25. Then the network part communicates 366 on the FO that it requires retransmissions of transmission units 312 and 314 on the TCH having a value of 25. The subscriber terminal transmits 368, 370 the requested transmission units. Finally the network part requests 372 again retransmission of transmission unit 312 on the FO, and the subscriber terminal performs 374 this. Thus the transmission has been completed and the reserved transmission capacity can be released.

The options to be described next concern both transmission directions. The transmitter may ask for extra capacity for transmitting a new amount of data after the previous transmission has ended, whereby a new RID is obtained for the order. The transmitter may also ask for extra capacity before the previous transmission has finished, whereby a new RID can be allocated for transmission, or it can be agreed that the requested amount of data is transmitted by means of the RID already allocated.

Orders as well as channel allocation signalling may be CRC-protected on the FO. Thus it is not necessary to include the L1-PDU-IDs of an order in the actual transmission units. If the CRC check is not passed at the receiving end of the order, the ordered transmission units are not transmitted. Thus the transmitter of the order does not receive the ordered transmission units and takes this into account in subsequent orders. Poor quality of the order can be also detected by means of another method.

The transmission units do not optionally comprise numbering or any other identification data. In that case the receiver can identify received transmission units on the basis of orders, known channel allocation and a transmission algorithm.

Ordering of transmission units may be a process separate from the allocation of the traffic channel used for transmission on the bidirectional radio connection. The network part may be responsible for all channel allocations both when it functions as a transmitter and when it functions as a receiver. On the basis of predetermined information and/or information received from the receiver the transmitter knows which order channel the transmitter should listen to and what timing would be suitable for listening.

In the described embodiment it is essential for both transmission directions that the transmitter informs the receiver of the organization of data and the receiver orders the desired transmission unit or packets. In an order it is possible to indicate selectively transmission units of several packets. In other words, the receiver can order the transmission units in random order. Usually, however, ordering is controlled by an algorithm which makes transmission more effective.

In addition to the foregoing, implementation of the protocol of the invention comprises several optional improvements which will be described in the following.

The receiver may request retransmission of only those transmission units that do not satisfy the required quality level. In that case the transmission units of a combined transmission unit that are of the poorest quality are retransmitted first. If the packet still cannot be correctly decoded after this, retransmissions of other transmission units are also requested.

A retransmission request or an order of a transmission unit may comprise the quality value of the transmission unit. The quality value is a way of indicating the quality of a transmission unit, being agreed in advance by the transmitter and the receiver, e.g. the quality values may be numerical values from 0 to n. The equivalencies could be e.g. the following: 0=not transmitted, 1=very poor quality, 2=rather poor quality . . . , n=a very good quality. This has the advantage that the transmitter may send the transmission units in the order according to the quality value. Thus the transmission units that have not been transmitted yet are transmitted first, then the transmission units that have a very poor quality value. The receiver does not need to give a definite order in which it wishes to receive the transmission units. Since the poorest transmission units are retransmitted first, the probability of the receiver being able to decode a packet correctly increases. Ordering of a packet or a retransmission request may correspondingly also comprise the quality value of the packet.

The receiver may notify the transmitter after it has succeeded in processing a transmission unit or a packet. This means that the receiver may at any time try to decode possible coding and interleaving and to check the error correction sum. If decoding succeeds without errors, the transmitter may conclude from this kind of a message that it no longer needs to retransmit the transmission units belonging to the packet in question, although there were a valid request for retransmitting them. This function is thus a kind of cancellation message.

The procedure to be described next has the advantage that the protocol tolerates well the interference caused by a fade. The protocol described above can also be implemented in such a manner that the receiver's order is valid until the receiver cancels it. In that case the transmitter sends transmission units until it receives a message that some transmission units no longer need to be sent. The transmitter does not necessarily notice such a cancellation message, if its quality is lower than a predetermined threshold value, and the transmitter continues to send the next transmission. When the transmitter receives a clear cancellation message, it starts to send the transmission unit that was ordered next. After the receiver has sent the cancellation message, the receiver cannot know whether the quality of the cancellation message has been sufficient when the transmitter has received it. Thus the receiver remains waiting for the next transmission unit. When the transmission unit arrives, there are three possibilities:

1) The quality of the received transmission unit does not correspond to the predetermined quality level and the receiver cannot identify the L1-PDU-ID of the transmission unit. The receiver cannot combine the received transmission unit with the combined transmission unit since it does not know which transmission unit is in question. Thus there is the previous combined transmission unit and an unidentified transmission unit in the receiver's memory. The receiver remains waiting for the next transmission unit.

2) The quality of the received transmission unit corresponds to the predetermined quality level and its L1-PDU-ID is the same as that of the identified transmission unit transmitted earlier. Now the receiver concludes that the transmitter did not receive a clear cancellation message, and thus it sends a new one. The receiver combines the transmission unit with the previous combined transmission unit. Possible unidentified transmission units received earlier are also combined with the previous combined transmission unit since now it is obvious that they must be similar to the last-received transmission unit that was identified.

3) The quality of the received transmission unit corresponds to the predetermined quality level and its L1-PDU-ID is different from that of the previous identified transmission unit. Now the receiver concludes that the transmitter received a clear cancellation message and the last-received transmission unit is the next transmission unit. The receiver can combine possible identified transmission units received earlier with the previous identified transmission unit and transmit the combined transmission unit to an upper layer of the protocol for further processing. At the same time, the receiver starts to collect a new transmission unit.

Although the invention has been described by means of an example illustrated in the accompanying drawings, it is evident that the invention is not limited to it, but it may be modified in several ways within the scope of the inventive concept disclosed in the appended claims.

What is claimed is:

1. A method for transmitting packet switched data in a mobile communications system between a transmitter-receiver pair using an ARQ protocol, which mobile communications system comprises a network part and at least one subscriber terminal and a bidirectional radio connection between the network part and the subscriber terminal, and the transmitter-receiver pair is formed by the network part and the subscriber terminal, the method comprising:

inserting packet switched data to be transmitted on the bidirectional radio connection in transmission units:

the receiver orders the first transmission of transmission units;

the transmitter sends the transmission units according to the order of the first transmission;

checking the quality of each received transmission unit indepently;

the receiver orders the retransmission of those received transmission units that were not of a good enough quality;

the transmitter sends the transmission units according to the retransmission order;

retransmission-ordering and retransmission are repeated until the quality measured by the receiver from each packet exceeds the predetermined quality level and the data which is to be transmitted and consists of packets is transmitted from the transmitter to the receiver.

2. A method according to claim 1, wherein the retransmission-order of a transmission unit comprises the quality value of the transmission unit.

3. A method according to claim 1, wherein the transmitter informs the receiver of the organization of the data.

4. A method according to claim 1, wherein transmission units of at least two different packets are indicated selectively in the order.

5. A method according to claim 1, wherein only ordered transmission units are sent.

6. A method according to claim 1, wherein the transmission units are sent according to a predetermined algorithm and according to orders.

7. A method according to claim 1, wherein the order is executed only if the quality of the order message corresponds to the predetermined quality level of the order message.

8. A method according to claim 7, wherein the quality of the order message is determined by checking the CRC of the order message.

9. A method according to claim 8, wherein the order message is retransmitted repeatedly until the order message passes the CRC check.

10. A method according to claim 1, wherein the order of transmission units is a process separate from allocation of the traffic channel to be used for transmission on a bidirectional radio connection.

11. A method according to claim 1, wherein the network part is responsible for all channel allocation both when it function as a transmitter and when it functions as a receiver.

12. A method according to claim 1, wherein the transmitter finds out from the information received from the receiver which transmission units the receiver no longer needs; and thus the transmitter deletes those transmission units from its transmission buffer.

13. A method according to claim 1, wherein the transmitter knows on the basis of predetermined information and/or the information received from the receiver which order channel the transmitter should listen to and what timing would be suitable for listening.

14. A method according to claim 1, wherein the transmission unit does not contain numbering or other identification data.

15. A method according to claim 14, wherein the receiver identifies transmission units on the basis of known channel allocation, orders and a transmission algorithm.

16. A method according to claim 1, wherein a CRC error checksum is formed for each transmission unit and/or packet in transmission, and this sum is used for checking at the receiving end whether the transmission unit and/or packet contains errors.

17. A method according to claim 1, wherein the quality of a received transmission unit is determined by forming the C/I ratio of the transmission unit by means of the training sequence.

18. A method according to claim 1, wherein the quality of the received transmission unit is determined by forming the bit error rate of the transmission unit.

19. A method according to claim 1, wherein the receiver combines the received transmission units and measures the quality of the combined transmission unit from the combined transmission unit.

20. A mobile communications system for transmitting packet switched data between a transmitter-receiver pair using an ARQ protocol, which mobile communications system comprises a network part and at least one subscriber terminal and a bidirectional radio connection between the network part and the subscriber terminal, and the transmitter-receiver pair is formed by network part and the subscriber terminal, and the packet switched data to be transmitted on the bidirectional radio connection is inserted in transmission units, and the network part and/or the subscriber terminal comprises a control part, which is arranged to control packet transmission in such a manner that the receiver orders the first transmission of transmission units, the transmitter sends the transmission units according to the order of the first transmission, receiver checks the quality of each received transmission unit indepently, the receiver orders the retransmission of those received transmission units that were not of a good enough quality, the transmitter sends the transmission units according to the retransmission order, and retransmission-ordering and retransmission are repeated until the quality measured by the receiver from each packet exceeds the predetermined quality level and the data which is to be transmitted and consists of packets is transmitted from the transmitter to the receiver.

* * * * *

UNITED STATES PATENT AND TRADEMARK OFFICE
CERTIFICATE OF CORRECTION

PATENT NO.     : 6,289,003 B1
DATED          : September 11, 2001
INVENTOR(S)    : Mika Raitola et al.

It is certified that error appears in the above-identified patent and that said Letters Patent is hereby corrected as shown below:

<u>Title page,</u>
Item [73], Assignee: "EspooMobile" should read -- Nokia Mobile --.

Signed and Sealed this

Thirteenth Day of August, 2002

*Attest:*

*Attesting Officer*

JAMES E. ROGAN
*Director of the United States Patent and Trademark Office*